US012215589B2

(12) United States Patent
Senda

(10) Patent No.: US 12,215,589 B2
(45) Date of Patent: Feb. 4, 2025

(54) GAS TURBINE ENGINE

(71) Applicant: Honda Motor Co., Ltd., Tokyo (JP)

(72) Inventor: Kenichi Senda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/634,992

(22) Filed: Apr. 14, 2024

(65) Prior Publication Data

US 2024/0401495 A1 Dec. 5, 2024

(30) Foreign Application Priority Data

Jun. 1, 2023 (CN) ......................... 202310638705.5

(51) Int. Cl.

*F01D 15/10* (2006.01)
*F01D 11/02* (2006.01)
*F01D 25/16* (2006.01)

(52) U.S. Cl.

CPC .............. *F01D 15/10* (2013.01); *F01D 11/02* (2013.01); *F01D 25/168* (2013.01); *F05D 2220/76* (2013.01)

(58) Field of Classification Search

CPC ...... F01D 15/026; F01D 15/027; F01D 15/06; F01D 15/10; F01D 11/02; F01D 25/168; F05D 2220/76; F04D 29/28; F04D 29/041; F04D 29/044

See application file for complete search history.

(56) References Cited

U.S. PATENT DOCUMENTS

| | | | | |
|---|---|---|---|---|
| 5,827,040 A * | 10/1998 | Bosley | ................ | F16C 32/0692 417/407 |
| 2012/0152383 A1* | 6/2012 | Lugo | ................... | F16C 32/0614 29/428 |
| 2015/0275903 A1* | 10/2015 | Klusacek | .............. | F04D 25/045 416/199 |

FOREIGN PATENT DOCUMENTS

| | | |
|---|---|---|
| JP | 2002206402 | 7/2002 |
| JP | 2022157785 | 10/2022 |

OTHER PUBLICATIONS

Takao Miyawaki et al., “Machine Technology and Quality Control of Gas Turbine”, Turbo Machinery, vol. 19, No. 9, Sep. 1991, with English translation thereof, pp. 1-18.

* cited by examiner

*Primary Examiner* — Elton K Wong
(74) *Attorney, Agent, or Firm* — JCIPRNET

(57) ABSTRACT

A gas turbine engine includes: a turbine wheel and a compressor wheel, coaxially configured and rotating integrally; a rotary shaft, including an outer shaft portion, a penetration portion, and an inner shaft portion; and a thrust cancel disc, provided between inner surfaces of the turbine wheel and the compressor wheel. The compressor wheel has a hollow portion through which the inner shaft portion passes. The turbine wheel has a first thread portion protruding from the inner surface, and at least one end portion of the inner shaft portion has a second thread portion. The thrust cancel disc is connected to the inner surfaces of the turbine wheel and the compressor wheel, respectively. A through hole is provided in a center of the thrust cancel disc, and the first thread portion or the end portion of the inner shaft portion with the second thread portion passes through the through hole.

10 Claims, 7 Drawing Sheets

GAS TURBINE ENGINE

CROSS-REFERENCE TO RELATED APPLICATION

This application claims the priority benefit of China application serial no. 202310638705.5, filed on Jun. 1, 2023. The entirety of the above-mentioned patent application is hereby incorporated by reference herein and made a part of this specification.

TECHNICAL FIELD

The disclosure relates to a gas turbine engine.

DESCRIPTION OF RELATED ART

In recent years, in order to ensure that more people have access to affordable, reliable, sustainable, and advanced energy, research and development has been conducted to improve the energy efficiency of gas turbine engines used to drive generators.

In the related art (Japanese Patent Application Laid-Open (JP-A) No. 2022-157785), a gas turbine engine usually includes: a turbine wheel and a compressor wheel coaxially configured and integrally rotating, and a rotary shaft configured to connect the turbine wheel and the compressor wheel and transmit the rotation of the turbine wheel to the driving member (e.g., the rotor of the motor generator). In this way, the combustion air compressed by the compressor wheel expands after combustion, and the turbine wheel is able to start to rotate at a high speed and drives the compressor wheel to rotate together at a high speed through the rotary shaft.

In such a gas turbine engine, in order to enable the turbine wheel and the compressor wheel to be coaxially configured and rotate integrally, the output shaft of the turbine wheel is passed through the hollow portion of the compressor wheel, and a male thread portion is provided at the end portion of the output shaft of the turbine wheel, so as to be screwed with the female thread portion provided at the end portion of the rotary shaft of the driving member. Furthermore, an annular ring member is provided between the turbine wheel and the compressor wheel to prevent rotational misalignment of the turbine wheel and the compressor wheel. The fitting structure of the ring member fits into the annular protruding portions of the turbine wheel and the compressor wheel, allowing easy centering of the turbine wheel and the compressor wheel.

However, in such a gas turbine engine, the output shaft of the turbine wheel mainly transmits the rotation of the turbine wheel to the driving member and the centering of the turbine wheel and compressor wheel by the ring member has the following problems. When the rotation of the turbine wheel is mainly transmitted by the rotary shaft of the turbine wheel, a large diameter of the rotary shaft of the turbine wheel is required, thus increasing the weight of the rotation mass. In addition, in the case of assembly, especially reassembly, since the male thread portion of the output shaft of the turbine wheel and the female thread portion of the rotary shaft of the driving member are screwed together in a hard-to-see location (such as the end of the hollow portion of the compressor wheel), therefore, it takes more time to confirm the screwing condition. Besides, when centering is performed on the turbine wheel and the compressor wheel through the ring member, if the fitting structure of the ring member and the annular protruding portion of the turbine wheel and the compressor wheel cannot be accurately fitted, it takes more time to confirm the condition of the centering.

The disclosure implements a gas turbine engine that may improve energy efficiency and improve assembly efficiency.

SUMMARY

The disclosure provides a gas turbine engine that may improve energy efficiency and improve assembly efficiency.

The disclosure provides a gas turbine engine, including: a turbine wheel; a compressor wheel, coaxially configured with the turbine wheel and rotating integrally; a rotary shaft, including an outer shaft portion connected to the compressor wheel, a penetration portion extending along an axis direction and formed at an axis center of the outer shaft portion, and an inner shaft portion passing through the penetration portion and connected to the turbine wheel, so that rotation of the turbine wheel is transmitted to a driving member; and a thrust cancel disc, provided between an inner surface of the turbine wheel and an inner surface of the compressor wheel. The compressor wheel has a hollow portion extending along the axis direction and formed at an axis center. At least the inner shaft portion of the rotary shaft passes through the hollow portion. The turbine wheel has a first thread portion protruding from a center of the inner surface of the turbine wheel toward the inner surface of the compressor wheel. At least one end portion of the inner shaft portion extends toward the inner surface of the turbine wheel and has a second thread portion screwed with the first thread portion. Two side surfaces of the thrust cancel disc are respectively provided with an annular gear-shaped first convex portion structure. The inner surface of the turbine wheel and the inner surface of the compressor wheel are respectively provided with an annular gear-shaped second convex portion structure. The thrust cancel disc is connected to the inner surface of the turbine wheel and the inner surface of the compressor wheel, respectively, through coupling of the first convex portion structure and the second convex portion structure. A through hole is provided in a center of the thrust cancel disc, and the first thread portion of the turbine wheel or the end portion of the inner shaft portion with the second thread portion passes through the through hole.

Based on the above, in the gas turbine engine of the disclosure, the thrust cancel disc is provided between the inner surface of the turbine wheel and the inner surface of the compressor wheel and is connected to the inner surface of the turbine wheel and the inner surface of the compressor wheel, respectively, through coupling of the annular gear-shaped first convex portion structures provided on the two side surfaces thereof and the annular gear-shaped second convex portion structures provided on the inner surface of the turbine wheel and the inner surface of the compressor wheel, respectively. Furthermore, the turbine wheel has a first thread portion protruding from the inner surface, at least the inner shaft portion of the rotary shaft passes through the hollow portion of the compressor wheel, and one end portion of the inner shaft portion has a second thread portion. The through hole is provided in the center of the thrust cancel disc, and the first thread portion of the turbine wheel or the end portion of the inner shaft portion with the second thread portion passes through the through hole. In this way, the thrust cancel disc may cancel the thrust force acting between the turbine wheel and the compressor wheel, thereby suppressing the burden on the bearing that maintains the rotary shaft rotatably. In addition, since the rotation of the turbine wheel is transmitted to the compressor wheel through the thrust cancel disc, the output shaft of the turbine wheel in conventional technology is not required, and the energy efficiency may be improved or the material cost may be lowered by the reduced weight including the rotation mass of the turbine wheel. Furthermore, the thrust cancel disc may also easily center the turbine wheel and the compressor wheel during assembly, especially reassembly. Moreover, the first thread portion of the turbine wheel and the second thread portion of the rotary shaft are screwed together around the thrust cancel disc, that is, in the space between the turbine wheel and the compressor wheel, thereby allowing easy confirmation on the screwing condition. Accordingly, the gas turbine engine of the disclosure may improve energy efficiency and improve assembly efficiency.

In order to make the aforementioned features and advantages of the disclosure comprehensible, embodiments accompanied with drawings are described in detail below.

DESCRIPTION OF THE EMBODIMENTS

In the embodiment of the disclosure, a hole diameter of the through hole is larger than an outer diameter of the end portion of the inner shaft portion with the second thread portion, and the end portion of the inner shaft portion with the second thread portion is located in the through hole, so that the second thread portion is screwed with the first thread portion in the through hole.

In the embodiment of the disclosure, a region covered by the first convex portion structure in the axis direction overlaps with the through hole in the axis direction, and the end portion of the inner shaft portion with the second thread portion is provided within the region covered by the first convex portion structure in the axis direction.

In the embodiment of the disclosure, the gas turbine engine further includes: a housing, including the turbine wheel and the compressor wheel; and a separating wall, installed on the housing and separating the turbine wheel and the compressor wheel. A central hole portion is provided in a center of the separating wall. A hole diameter of the central hole portion is larger than an outer diameter of the thrust cancel disc. The thrust cancel disc is located in the central hole portion, so that an outer circumferential surface of the thrust cancel disc and an inner circumferential surface of the separating wall, that is, a wall surface of the central hole portion, are provided opposite to each other.

In the embodiment of the disclosure, a labyrinth seal structure is provided between the outer circumferential surface of the thrust cancel disc and the inner circumferential surface of the separating wall, that is, the wall surface of the central hole portion, for sealing.

In the embodiment of the disclosure, the driving member is a rotor of a motor generator.

Figure 1:
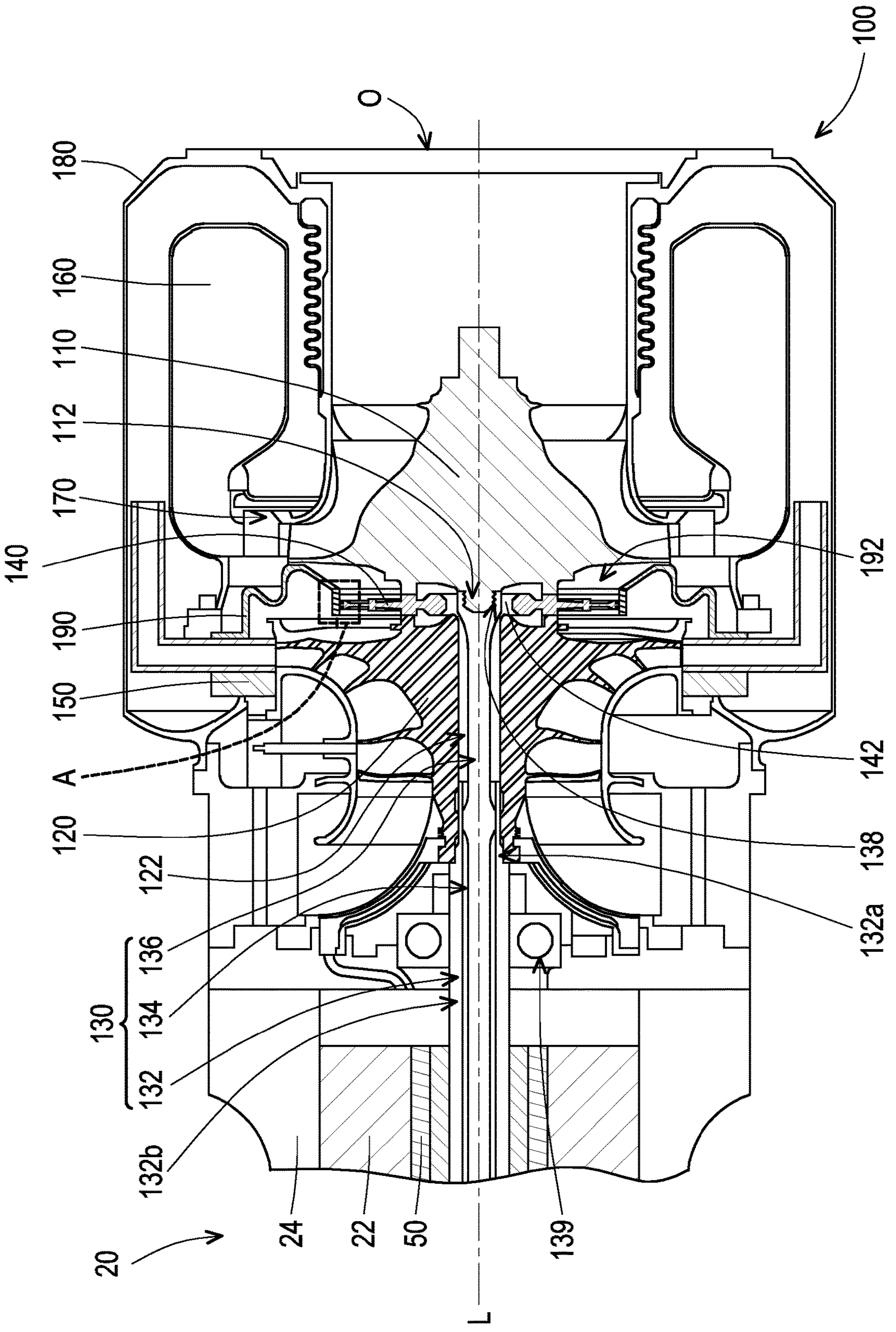
FIG. 1 is a cross-sectional schematic view of the gas turbine engine cut along the axis direction when coupled with the driving member according to one embodiment of the disclosure.
Figure 2:
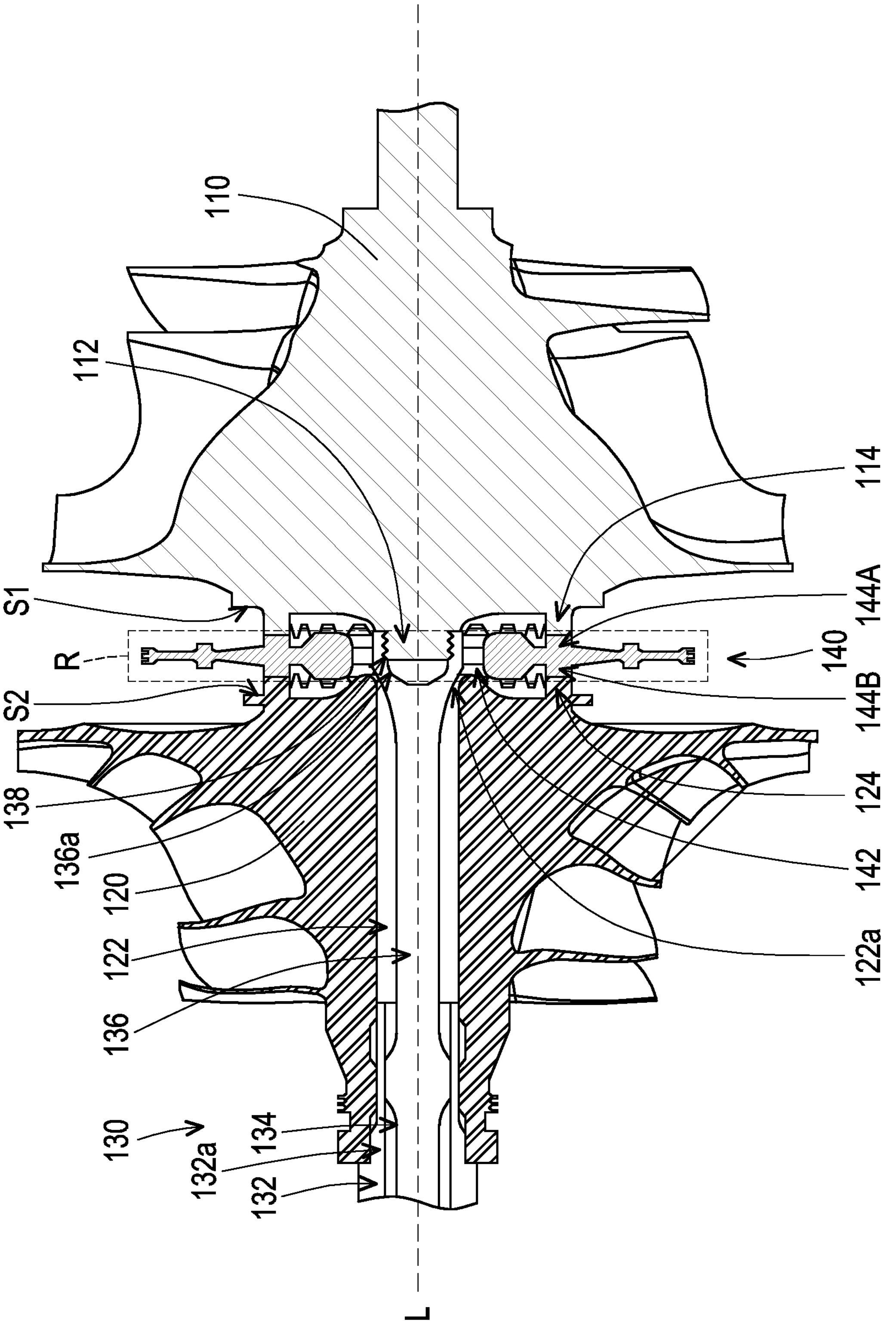
FIG. 2 is a partial schematic view of the turbine wheel, the compressor wheel, the rotary shaft, the thrust cancel disc, etc., used in the gas turbine engine shown in FIG. 1, cut along the axis direction.
Figure 3:
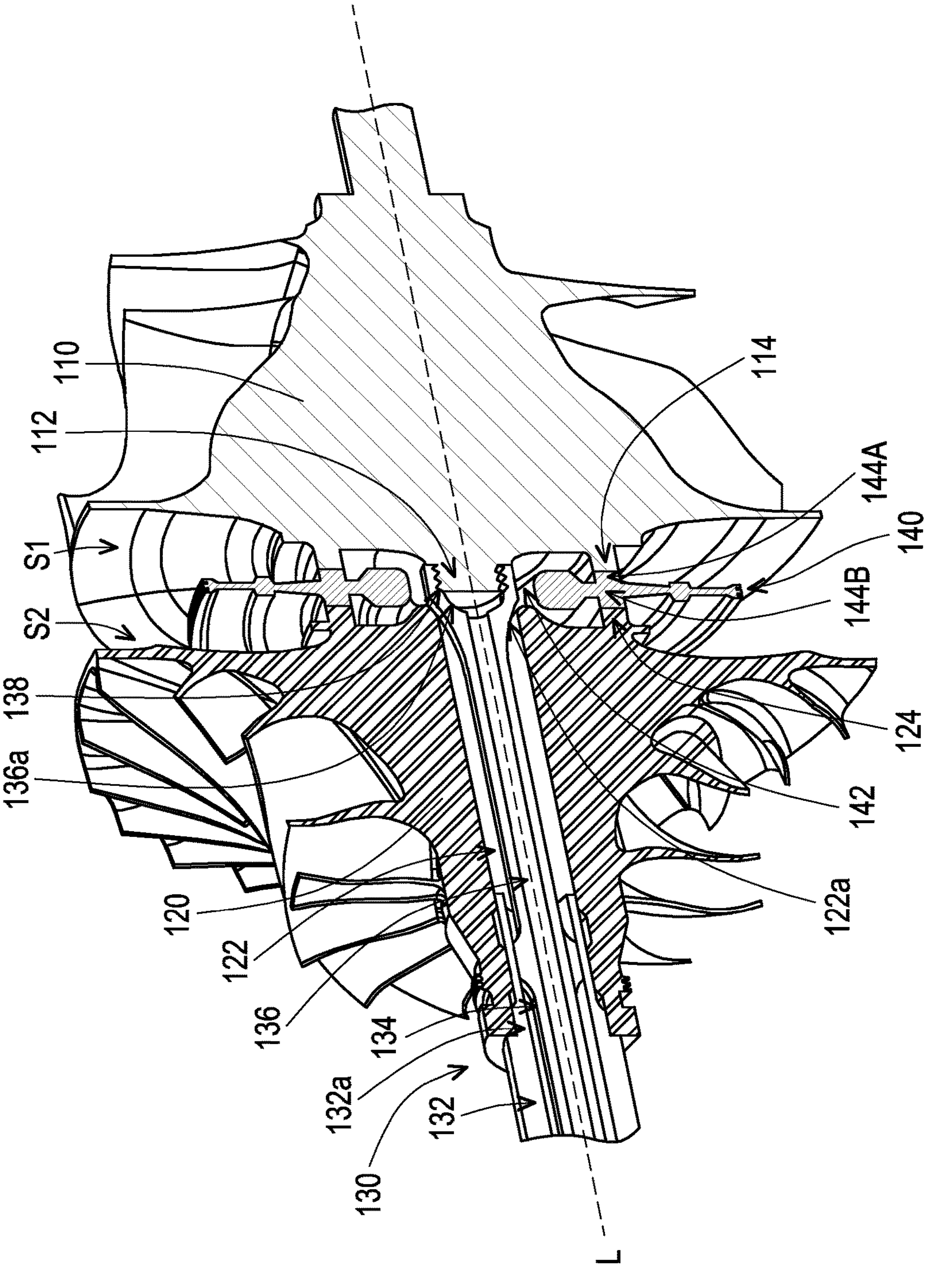
FIG. 3 is a perspective schematic view of the turbine wheel, the compressor wheel, the rotary shaft, the thrust cancel disc, etc., used in the gas turbine engine shown in FIG. 2, cut along the axis direction.
Figure 4:
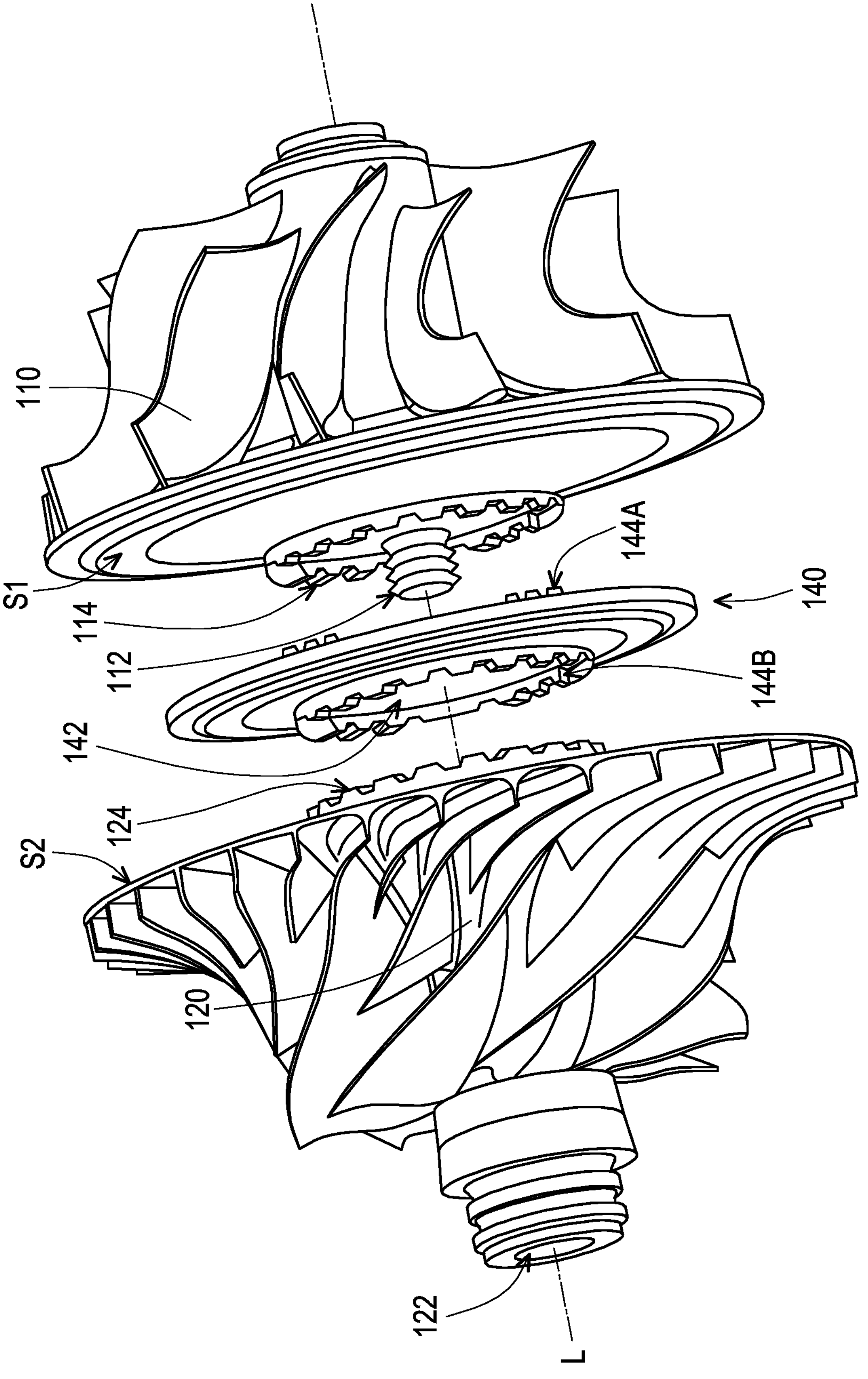
FIG. 4 is an exploded schematic view of the turbine wheel, the compressor wheel, and the thrust cancel disc used in the gas turbine engine shown in FIG. 2.
Figure 5:
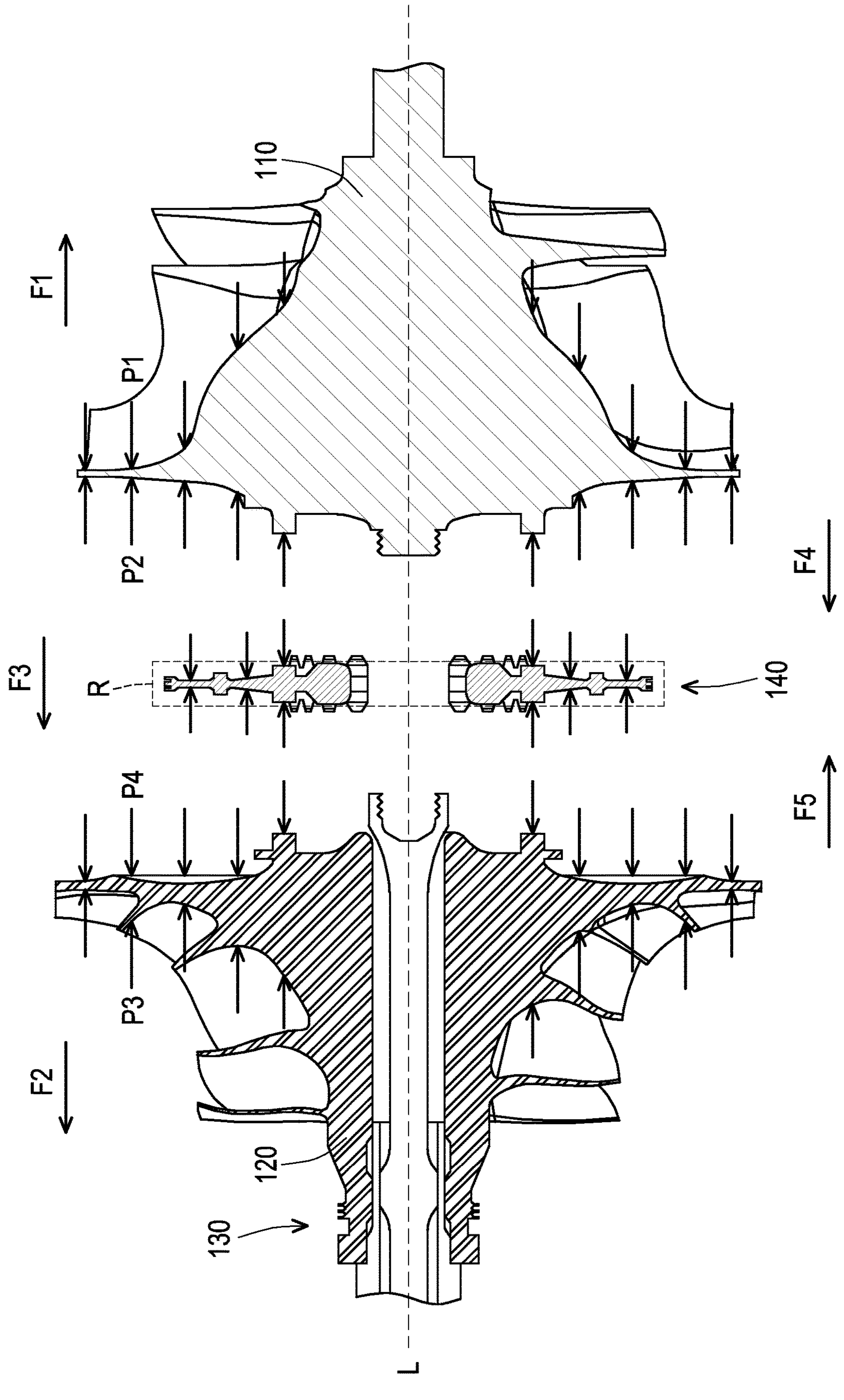
FIG. 5 is a schematic view illustrating the thrust cancel disc used in the gas turbine engine shown in FIG. 2 in a state of canceling the thrust force acting between the turbine wheel and the compressor wheel.
Figure 6:
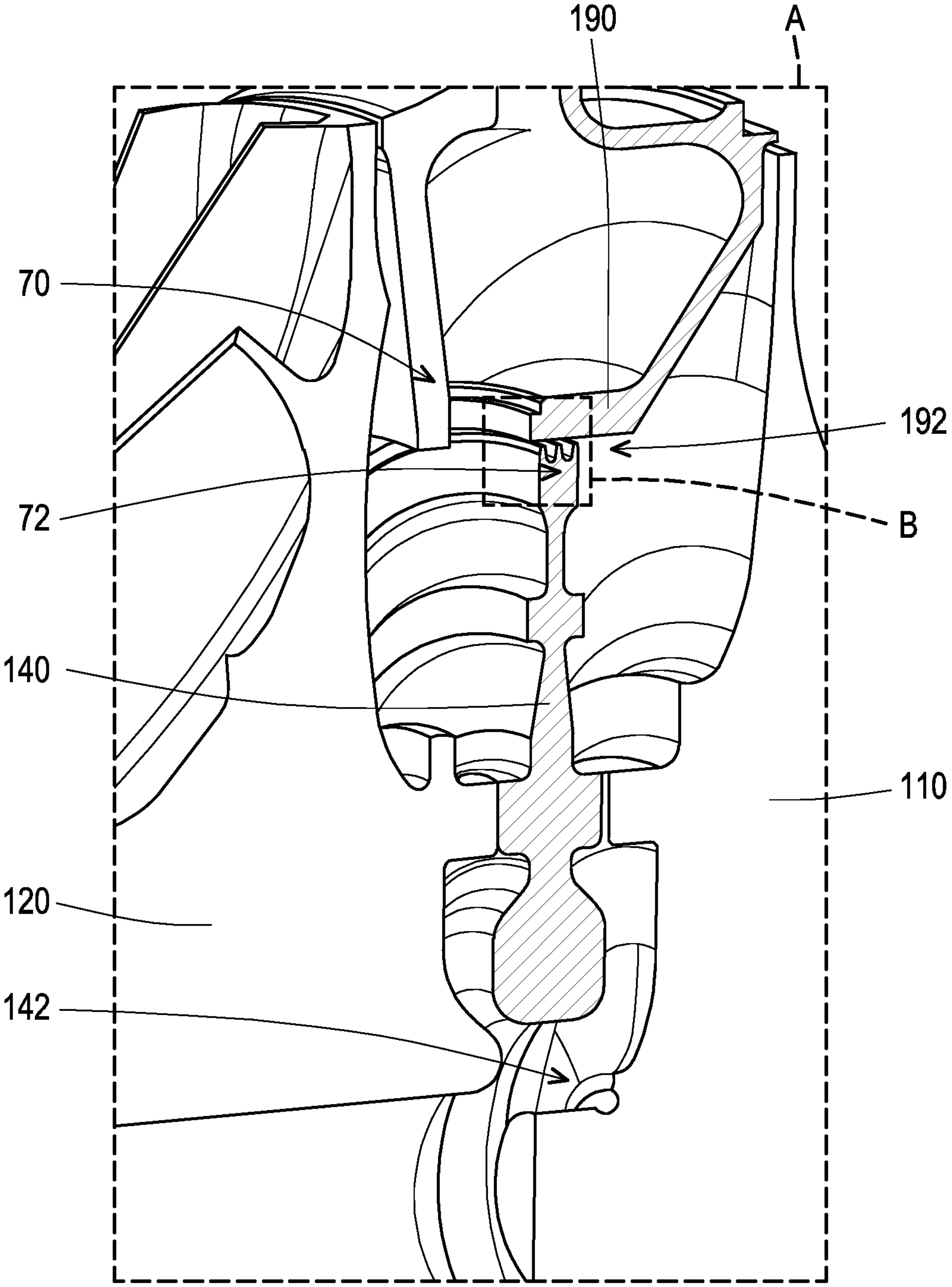
FIG. 6 is a partially enlarged schematic view of the gas turbine engine in area A shown in FIG. 1.
Figure 7:
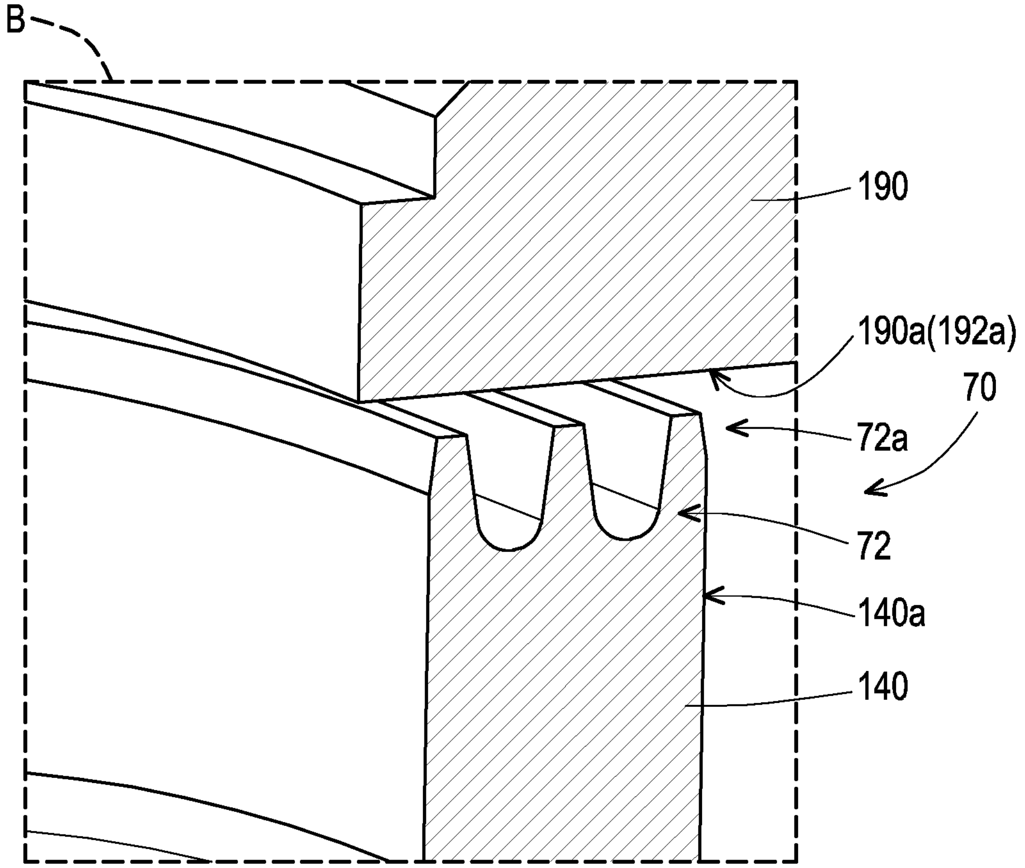
FIG. 7 is a partially enlarged schematic view of the gas turbine engine in area B shown in FIG. 6.

FIG. 1 is a cross-sectional schematic view of the gas turbine engine cut along the axis direction when coupled with the driving member according to one embodiment of the disclosure. FIG. 2 is a partial schematic view of the turbine wheel, the compressor wheel, the rotary shaft, the thrust cancel disc, etc., used in the gas turbine engine shown in FIG. 1, cut along the axis direction. FIG. 3 is a perspective schematic view of the turbine wheel, the compressor wheel, the rotary shaft, the thrust cancel disc, etc., used in the gas turbine engine shown in FIG. 2, cut along the axis direction. FIG. 4 is an exploded schematic view of the turbine wheel, the compressor wheel, and the thrust cancel disc used in the gas turbine engine shown in FIG. 2. FIG. 5 is a schematic view illustrating the thrust cancel disc used in the gas turbine engine shown in FIG. 2 in a state of canceling the thrust force acting between the turbine wheel and the compressor wheel. FIG. 6 is a partially enlarged schematic view of the gas turbine engine in area A shown in FIG. 1. FIG. 7 is a partially enlarged schematic view of the gas turbine engine in area B shown in FIG. 6. The specific structure and application of the gas turbine engine 100 in one embodiment of the disclosure are described below with reference to FIG. 1 to FIG. 7. However, these are only some examples of the disclosure, and disclosure is not limited thereto.

Referring to FIG. 1 to FIG. 4, in this embodiment, the gas turbine engine 100 includes a turbine wheel 110, a compressor wheel 120, a rotary shaft 130, and a thrust cancel disc 140. The compressor wheel 120 is coaxially configured with the turbine wheel 110 (e.g., both with axis centers that correspond to the axis direction L) and rotates integrally. The rotary shaft 130 includes an outer shaft portion 132 connected to the compressor wheel 120, a penetration portion 134 extending along the axis direction L and formed at an axis center of the outer shaft portion 132, and an inner shaft portion 136 passing through the penetration portion 134 and connected to the turbine wheel 110, so that the rotation of the turbine wheel 110 is transmitted to a driving member. Furthermore, the thrust cancel disc 140 is provided between an inner surface S1 of the turbine wheel 110 and an inner surface S2 of the compressor wheel 120. In this way, the rotation of the turbine wheel 110 may drive the compressor wheel 120 to rotate synchronously through the rotary shaft 130 and is transmitted to the driving member 50 through the rotary shaft 130.

Specifically, in the embodiment shown in FIG. 1, the gas turbine engine 100 further includes a diffuser 150, a combustor 160, and a turbine nozzle 170. The turbine nozzle 170 surrounds the turbine wheel 110, the combustor 160 surrounds the turbine nozzle 170, and the diffuser 150 is provided between the compressor wheel 120 and the combustor 160. In this way, the combustion air compressed by the compressor wheel 120 reaches the combustor 160 via the diffuser 150, etc., and the combustion gas produced by mixing and combusting the fuel and the compressed combustion air enters the turbine nozzle 170 and expands in the turbine nozzle 170, as a result, the turbine wheel 110 is able to start to rotate at a high speed and drives the compressor wheel 120 to rotate at a high speed through the rotary shaft 130. In addition, the rotation of the turbine wheel 110 is transmitted to the driving member 50 through the rotary shaft 130, and the combustion gas is discharged from the discharge portion O. However, the specific structure of the gas turbine engine 100 is not limited by the disclosure and may be adjusted according to needs.

In such a gas turbine engine 100, as shown in FIG. 1 to 3, the rotary shaft 130 is extended along the axis direction L, the outer shaft portion 132 is connected to the compressor wheel 120, and the inner shaft portion 136 passing through the penetration portion 134 of the outer shaft portion 132 is connected to the turbine wheel 110. As shown in FIG. 2 and FIG. 3, the compressor wheel 120 has a hollow portion 122 extending along the axis direction L and formed at the axis center, and at least the inner shaft portion 136 of the rotary shaft 130 passes through the hollow portion 122. For example, the end portion 132*a* of the outer shaft portion 132 of the rotary shaft 130 is provided at the end of the hollow portion 122 of the compressor wheel 120 (and further penetrates the hollow portion 122), and the inner shaft portion 136 extends further through the hollow portion 122 toward the inner surface S1 of the turbine wheel 110. Specifically, the end portion 132*a* of the outer shaft portion 132 of the rotary shaft 130 is provided with splines on the outer circumference and engages with the splines provided on the inner circumference of the end of the hollow portion 122 of the compressor wheel 120, thereby being coupled to each other via spline coupling. However, in other embodiments not shown, the end portion 132*a* of the outer shaft portion 132 may also be provided at other locations of the compressor wheel 120 without penetrating the hollow portion 122.

Furthermore, in this embodiment, as shown in FIG. 2 and FIG. 3, the turbine wheel 110 has a first thread portion 112 protruding from the center of the inner surface S1 of the turbine wheel 110 toward the inner surface S2 of the compressor wheel 120, and one end portion 136*a* of the inner shaft portion 136 extends toward the inner surface S1 of the turbine wheel 110 and has a second thread portion 138 screwed with the first thread portion 112. It may be seen that at least the inner shaft portion 136 of the rotary shaft 130 passes through the hollow portion 122 of the compressor wheel 120, and the rotary shaft 130 is screwed with the first thread portion 112 of the turbine wheel 110 protruding from the inner surface S1 through the second thread portion 138 provided at the end portion 136*a* of the inner shaft portion 136, so that the turbine wheel 110, the compressor wheel 120, and the rotary shaft 130 are connected to each other. In this way, the compressor wheel 120 and the turbine wheel 110 may be coaxially configured through the rotary shaft 130 and may rotate integrally through the screwing of the first thread portion 112 and the second thread portion 138.

In addition, in this embodiment, as shown in FIG. 2 to FIG. 4, the thrust cancel disc 140 is configured in a disk shape, and a through hole 142 is provided in the center of the thrust cancel disc 140, which is equivalent to a ring-shaped member. The thrust cancel disc 140 is connected to the inner surface S1 of the turbine wheel 110 and the inner surface S2 of the compressor wheel 120, respectively. Furthermore, the two side surfaces of the thrust cancel disc 140 are respectively provided with an annular gear-shaped first convex portion structures 144A and 144B. Multiple teeth provided at the edges of the first convex portion structures 144A and 144B are continuously provided along the circumferential direction of the thrust cancel disc 140 and protrude toward the outside. Correspondingly, the inner surface S1 of the turbine wheel 110 is provided with an annular gear-shaped second convex portion structure 114 (located on the outer circumferential side of the first thread portion 112), and the inner surface S2 of the compressor wheel 120 is provided with an annular gear-shaped second convex portion structure 124 (located on the outer circumferential side of the opening 122*a* of the hollow portion 122). The connection through the engagement of the annular gear-shaped first convex portion structures 144A and 144B and the annular gear-shaped second convex portion structures 114 and 124 is called curvic coupling. In this way, the thrust cancel disc 140 is connected to the inner surface S1 of the turbine wheel 110 and the inner surface S2 of the compressor wheel 120, respectively, through coupling of the first convex portion structures 144A and 144B and the second convex portion structures 114 and 124.

It may be seen that in this embodiment, the thrust cancel disc 140 is provided between the inner surface S1 of the turbine wheel 110 and the inner surface S2 of the compressor wheel 120 and is connected to the inner surface S1 of the turbine wheel 110 and the inner surface S2 of the compressor wheel 120, respectively, through coupling (i.e., curvic coupling) of the first convex portion structures 144A and 144B and the second convex portion structures 114 and 124. In this way, the compressor wheel 120 and the turbine wheel 110 may be tightly coupled through the thrust cancel disc 140 and rotate integrally. Moreover, the center of the through hole 142 of the thrust cancel disc 140 corresponds to the axis center of the turbine wheel 110 and the axis center of the compressor wheel 120 (e.g., both correspond to the axis direction L). In this way, the thrust cancel disc 140 may easily center the turbine wheel 110 and the compressor wheel 120 during assembly, especially reassembly. That is, the centers of the turbine wheel 110, the thrust cancel disc 140, and the compressor wheel 120 may be easily assembled in correspondence with the axis direction L. Accordingly, the gas turbine engine 100 may improve energy efficiency and improve assembly efficiency. However, the manner in which the thrust cancel disc 140 is coupled with the inner surface S1 of the turbine wheel 110 and the inner surface S2 of the compressor wheel 120 is not limited by the disclosure, which may be adjusted according to needs.

In addition, in this embodiment, as shown in FIG. 5, during the rotation of the turbine wheel 110 and the compressor wheel 120, the turbine wheel 110 bears the pressure P1 from the outside to the inside and the pressure P2 from the inside to the outside, thereby generating a thrust force F1 toward the turbine wheel 110. Similarly, the compressor wheel 120 bears the pressure P3 from the outside to the inside and the pressure P4 from the inside to the outside, thereby generating a thrust force F2 toward the compressor wheel 120. Under normal circumstances, the result of the thrust force F1 toward the turbine wheel 110 and the thrust force F2 toward the compressor wheel 120 constitutes a thrust force F3 toward the rotary shaft 130, thereby placing a burden on the bearing 139 (shown in FIG. 1) that maintains the rotary shaft 130 rotatably on the driving member 50. Correspondingly, in this embodiment, since the thrust cancel disc 140 is provided between the inner surface S1 of the turbine wheel 110 and the inner surface S2 of the compressor wheel 120, the two opposite side surfaces of the thrust cancel disc 140 also generate corresponding thrust force F4 and thrust force F5 during the rotation. In FIG. 5, although the two opposite side surfaces of the thrust cancel disc 140 are separated from the inner surface S1 of the turbine wheel 110 and the inner surface S2 of the compressor wheel 120 to show the pressure application state, in fact, the thrust cancel disc 140 is closely coupled with the inner surface S1 of the turbine wheel 110 and the inner surface S2 of the compressor wheel 120 through curvic coupling.

It may be seen that in this case, the thrust force F4 generated by the thrust cancel disc 140 may be used to cancel at least part of the thrust force F1 acting on the turbine wheel 110, and the thrust force F5 generated by the thrust cancel disc 140 may be used to cancel at least part of the thrust force F2 acting on the compressor wheel 120. In this way, even if the thrust force F1 toward the turbine wheel 110 (canceled by the thrust force F4 at least partially) and the thrust force F2 toward the compressor wheel 120 (canceled by the thrust force F5 at least partially) still constitutes the thrust force F3 toward the rotary shaft 130, the magnitude of the thrust force F3 may be reduced (or the thrust force F3 may be completely eliminate) through the thrust cancel disc 140. In this way, the thrust cancel disc 140 may cancel the thrust forces F1 and F2 acting between the turbine wheel 110 and the compressor wheel 120, thereby suppressing the burden on the bearing 139 used by the rotary shaft 130 and extending the life of the bearing 139. In addition, the rotation of the turbine wheel 110 may be transmitted through the thrust cancel disc 140 and the compressor wheel 120 of considerable thickness coupled by curvic coupling. In this way, at least the inner shaft portion 136 of the rotary shaft 130 may be made thin, thereby reducing the weight of the rotary shaft 130 and the connected driving member 50. However, the disclosure is not limited thereto and may be adjusted according to needs.

Furthermore, in this embodiment, as shown in FIGS. 2 and 3, although the thrust cancel disc 140 is provided between the inner surface S1 of the turbine wheel 110 and the inner surface S2 of the compressor wheel 120, since the through hole 142 is provided in the center of the thrust cancel disc 140, the first thread portion 112 of the turbine wheel 110 or the end portion 136*a* of the inner shaft portion 136 with the second thread portion 138 passes through the through hole 142. In particular, the inner shaft portion 136 of the rotary shaft 130 passes through the hollow portion 122 of the compressor wheel 120 and extends outside the opening 122*a*, so that the second thread portion 138 provided on the end portion 136*a* of the inner shaft portion 136 is screwed with the first thread portion 112 on the outside of the hollow portion 122. At this time, although the inner surface S1 of the turbine wheel 110 and the inner surface S2 of the compressor wheel 120 are respectively located on the opposite sides of the thrust cancel disc 140, by providing the through hole 142 in the center of the thrust cancel disc 140, at least one of the first thread portion 112 and the second thread portion 138 may pass through the through hole 142 for screwing. It may be seen from this that the configuration of the thrust cancel disc 140 does not interfere with the screwing of the second thread portion 138 of the rotary shaft 130 and the first thread portion 112 of the turbine wheel 110. Moreover, since an additional output shaft is not required by the turbine wheel 110 for penetrating the hollow portion 122 of the compressor wheel 120 as in conventional technology, it is not necessary to screw the first thread portion 112 and the second thread portion 138 at a location such as the hollow portion 122 where it is difficult to confirm the screwing condition. That is, the first thread portion 112 of the turbine wheel 110 and the second thread portion 138 of the rotary shaft 130 are screwed together around the thrust cancel disc 140, that is, in the space between the turbine wheel 110 and the compressor wheel 120, thereby allowing easy confirmation on the screwing condition. Accordingly, the gas turbine engine 100 may improve energy efficiency and improve assembly efficiency.

Furthermore, as an example, as shown in FIG. 2 and FIG. 3, the hole diameter of the through hole 142 of the thrust cancel disc 140 is larger than the outer diameter of the end portion 136*a* of the inner shaft portion 136 with the second thread portion 138, and the end portion 136*a* of the inner shaft portion 136 with the second thread portion 138 is located in the through hole 142, so that the second thread portion 138 screws with the first thread portion 112 in the through hole 142. That is, the first thread portion 112 of the turbine wheel 110 and the second thread portion 138 of the rotary shaft 130 both penetrate into the through hole 142 to be screwed together. Furthermore, the region R (as shown in FIG. 2) covered by the first convex portion structures 144A and 144B on two side surfaces of the thrust cancel disc 140 in the axis direction L overlaps with the through hole 142 in the axis direction L. That is, the positions of the first convex portion structures 144A and 144B of the thrust cancel disc 140 in the axis direction L are further outside than the position of the through hole 142 in the axis direction L. Furthermore, the end portion 136*a* of the inner shaft portion 136 with the second thread portion 138 is provided in the region R covered by the first convex portion structures 144A and 144B in the axis direction L. In this way, the end portion 136*a* of the inner shaft portion 136 is configured within the region R covered by the first convex portion structures 144A and 144B in the axis direction L, enabling the second thread portion 138 provided on the end portion 136*a* of the inner shaft portion 136 to be screwed to the first thread portion 112 in the through hole 142.

However, in other embodiments not shown, the first thread portion 112 of the turbine wheel 110 may pass through the through hole 142 and screw with the second thread portion 138 near the inner surface S2 of the compressor wheel 120 (i.e., to the left side of the through hole 142); alternatively, the end portion 136*a* of the inner shaft portion 136 with the second thread portion 138 may pass through the through hole 142 and screw with the first thread portion 112 near the inner surface S1 of the turbine wheel 110 (i.e., to the right side of the through hole 142); alternatively, during the assembly process, the first thread portion 112 and the second thread portion 138 may be screwed to each other on one side of the through hole 142, and then the first thread portion 112 and the second thread portion 138 may be located in the through hole 142 by moving the rotary shaft 130, as long as the center of the thrust cancel disc 140 is provided with the through hole 142, and the first thread portion 112 of the turbine wheel 110 or the end portion 136*a* of the inner shaft portion 136 with the second thread portion 138 passes through the through hole 142 for screwing. The disclosure does not limit the screwing locations of the first thread portion 112 and the second thread portion 138 or the relative positions with the thrust cancel disc 140. Moreover, although the first thread portion 112 of the turbine wheel 110 is a male thread portion and the second thread portion 138 of the rotary shaft 130 is a female thread portion, the disclosure is not limited thereto and may be adjusted according to needs.

In addition, in this embodiment, as shown in FIG. 1, the gas turbine engine 100 further includes a housing 180. The housing 180 includes the turbine wheel 110 and the compressor wheel 120, and further includes the rotary shaft 130, the thrust cancel disc 140, the diffuser 150, the combustor 160, the turbine nozzle 170, etc., as mentioned above. In this way, the gas turbine engine 100 may be easily connected to the driving member 50 as one assembly; for example, another end portion 132*b* of the outer shaft portion 132 of the rotary shaft 130 opposite to the end portion 132*a* penetrates from the housing 180 and is coupled to the driving member 50. The driving member 50 is, for example, a rotor of the motor generator 20, and there are structures such as a stator 22 and an outer casing 24 of the motor generator 20 provided outside. The rotary shaft 130 of the gas turbine engine 100 is rotatably provided on the outer casing 24 of the motor generator 20 through the bearing 139 and is connected to the driving member 50 serving as the rotor of the motor generator 20. In this way, the rotation of the turbine wheel 110 of the gas turbine engine 100 may be transmitted to the driving member 50 through the rotary shaft 130 for rotational driving. However, in other embodiments not shown, the driving member 50 may also be a rotating fan of a jet engine, a transmission mechanism for vehicle, etc., the disclosure is not limited thereto and may be adjusted according to needs.

Furthermore, in this embodiment, as shown in FIG. 1, the gas turbine engine 100 further includes a separating wall 190. The separating wall 190 is installed on the housing 180 (e.g., inside the housing 180) and separates the turbine wheel 110 and the compressor wheel 120. As shown in FIG. 1, FIG. 6, and FIG. 7, a central hole portion 192 is provided in the center of the separating wall 190. The hole diameter of the central hole portion 192 is larger than the outer diameter of the thrust cancel disc 140, and the thrust cancel disc 140 is located in the central hole portion 192. It may be seen from this that the separating wall 190 is formed into an annular structure and surrounds the outer circumference of the thrust cancel disc 140 to separate the turbine wheel 110 and the compressor wheel 120, so that the thrust cancel disc 140 is located in the central hole portion 192 of the separating wall 190, and an outer circumferential surface 140*a* of the thrust cancel disc 140 and an inner circumferential surface 190*a* of the separating wall 190, that is, a wall surface 192*a* of the central hole portion 192, are provided opposite to each other. As shown in FIG. 6 and FIG. 7, a labyrinth seal structure 70 is provided between the outer circumferential surface 140*a* of the thrust cancel disc 140 and the inner circumferential surface 190*a* of the separating wall 190, that is, the wall surface 192*a* of the central hole portion 192 (as shown in area B in FIG. 1), for sealing.

Specifically, in this embodiment, as shown in FIG. 6 and FIG. 7, the labyrinth seal structure 70 includes a first sealing portion 72 formed on the outer circumferential surface 140*a* of the thrust cancel disc 140. The first sealing portion 72 is provided with a first concave and convex structure 72*a*. Correspondingly, the inner circumferential surface 190*a* of the separating wall 190, that is, the wall surface 192*a* of the central hole portion 192, is a plane facing the first concave and convex structure 72*a* in a cross-sectional view and located on the outer circumferential side of the first sealing portion 72. In this way, the first sealing portion 72 with the first concave and convex structure 72*a* forms a labyrinth flowing path space between the outer circumferential surface 140*a* of the thrust cancel disc 140 and the inner circumferential surface 190*a* of the separating wall 190. In this way, the labyrinth seal structure 70 may narrow the flowing path space through the first concave and convex structure 72*a*, so that the fluid generates pressure resistance and becomes difficult to flow. Thus, the area between the outer circumferential surface 140*a* of the thrust cancel disc 140 and the inner circumferential surface 190*a* of the separating wall 190, that is, the wall surface 192*a* of the central hole portion 192, is sealed.

Furthermore, in this embodiment, the first sealing portion 72 is a sealing structure integrally formed on the outer circumferential surface 140*a* of the thrust cancel disc 140, however, in other embodiments not shown, it may also be an additional sealing member provided on the outer circumferential surface 140*a* of the thrust cancel disc 140. Similarly, the labyrinth seal structure 70 may also include a second sealing portion with a second concave and convex structure, which is formed or provided on the inner circumferential surface 190*a* of the separating wall 190, that is, the wall surface 192*a* of the central hole portion 192, so as to replace or be combined with the first sealing portion 72. Moreover, in other embodiments not shown, a contact sealing structure may also be used to seal the area between the outer circumferential surface 140*a* of the thrust cancel disc 140 and the inner circumferential surface 190*a* of the separating wall 190, that is, the wall surface 192*a* of the central hole portion 192, or there may be no sealing structure. The disclosure is not limited thereto and may be adjusted according to needs.

To sum up, in the gas turbine engine of the disclosure, the thrust cancel disc is provided between the inner surface of the turbine wheel and the inner surface of the compressor wheel and is connected to the inner surface of the turbine wheel and the inner surface of the compressor wheel, respectively, through coupling (e.g., curvic coupling) of the annular gear-shaped first convex portion structures provided on the two side surfaces thereof and the annular gear-shaped second convex portion structures provided on the inner surface of the turbine wheel and the inner surface of the compressor wheel, respectively. Furthermore, the turbine wheel has a first thread portion protruding from the inner surface, at least the inner shaft portion of the rotary shaft passes through the hollow portion of the compressor wheel, and one end portion of the inner shaft portion has a second thread portion. The through hole is provided in the center of the thrust cancel disc, and the first thread portion of the turbine wheel or the end portion of the inner shaft portion with the second thread portion passes through the through hole. The end portion of the inner shaft portion with the second thread portion is located in the through hole, so that the second thread portion is screwed with the first thread portion in the through hole. In this way, the thrust cancel disc may cancel the thrust force acting between the turbine wheel and the compressor wheel, thereby suppressing the burden on the bearing that maintains the rotary shaft rotatably. In addition, since the rotation of the turbine wheel is transmitted to the compressor wheel through the thrust cancel disc by curvic coupling, the output shaft of the turbine wheel in conventional technology is not required, and the energy efficiency may be improved or the material cost may be lowered by the reduced weight including the rotation mass of the turbine wheel. Furthermore, the thrust cancel disc may also easily center the turbine wheel and the compressor wheel during assembly, especially reassembly. Moreover, the first thread portion of the turbine wheel and the second thread portion of the rotary shaft are screwed together around the thrust cancel disc, that is, in the space between the turbine wheel and the compressor wheel, thereby allowing easy confirmation on the screwing condition. Accordingly, the gas turbine engine of the disclosure may improve energy efficiency and improve assembly efficiency.

Finally, it should be noted that the foregoing embodiments are only used to illustrate the technical solutions of the disclosure, but not to limit the disclosure; although the disclosure has been described in detail with reference to the foregoing embodiments, persons of ordinary skill in the art should understand that the technical solutions described in the foregoing embodiments can still be modified, or parts or all of the technical features thereof can be equivalently replaced; however, these modifications or substitutions do not deviate the essence of the corresponding technical solutions from the scope of the technical solutions of the embodiments of the disclosure.

What is claimed is:

1. A gas turbine engine, comprising:

a turbine wheel;

a compressor wheel, coaxially configured with the turbine wheel and rotating integrally;

a rotary shaft, comprising an outer shaft portion connected to the compressor wheel, a penetration portion extending along an axis direction and formed at an axis center of the outer shaft portion, and an inner shaft portion passing through the penetration portion and connected to the turbine wheel, so that rotation of the turbine wheel is transmitted to a driving member; and a thrust cancel disc, provided between an inner surface of the turbine wheel and an inner surface of the compressor wheel, wherein the compressor wheel has a hollow portion extending along the axis direction and formed at an axis center, and at least the inner shaft portion of the rotary shaft passes through the hollow portion, the turbine wheel has a first thread portion protruding from a center of the inner surface of the turbine wheel toward the inner surface of the compressor wheel, at least one end portion of the inner shaft portion extends toward the inner surface of the turbine wheel and has a second thread portion screwed with the first thread portion, two side surfaces of the thrust cancel disc are respectively provided with an annular gear-shaped first convex portion structure, the inner surface of the turbine wheel and the inner surface of the compressor wheel are respectively provided with an annular gear-shaped second convex portion structure, and the thrust cancel disc is connected to the inner surface of the turbine wheel and the inner surface of the compressor wheel, respectively, through coupling of the first convex portion structure and the second convex portion structure, and a through hole is provided in a center of the thrust cancel disc, and the first thread portion of the turbine wheel or the end portion of the inner shaft portion with the second thread portion passes through the through hole.

2. The gas turbine engine according to claim 1, wherein a hole diameter of the through hole is larger than an outer diameter of the end portion of the inner shaft portion with the second thread portion, and the end portion of the inner shaft portion with the second thread portion is located in the through hole, so that the second thread portion is screwed with the first thread portion in the through hole.

3. The gas turbine engine according to claim 2, wherein a region covered by the first convex portion structure in the axis direction overlaps with the through hole in the axis direction, and the end portion of the inner shaft portion with the second thread portion is provided within the region covered by the first convex portion structure in the axis direction.

4. The gas turbine engine according to claim 3, further comprising:

a housing, comprising the turbine wheel and the compressor wheel; and a separating wall, installed on the housing and separating the turbine wheel and the compressor wheel, wherein a central hole portion is provided in a center of the separating wall, a hole diameter of the central hole portion is larger than an outer diameter of the thrust cancel disc, and the thrust cancel disc is located in the central hole portion, so that an outer circumferential surface of the thrust cancel disc and an inner circumferential surface of the separating wall, that is, a wall surface of the central hole portion, are provided opposite to each other.

5. The gas turbine engine according to claim 3, wherein the driving member is a rotor of a motor generator.

6. The gas turbine engine according to claim 2, further comprising:

a housing, comprising the turbine wheel and the compressor wheel; and a separating wall, installed on the housing and separating the turbine wheel and the compressor wheel, wherein a central hole portion is provided in a center of the separating wall, a hole diameter of the central hole portion is larger than an outer diameter of the thrust cancel disc, and the thrust cancel disc is located in the central hole portion, so that an outer circumferential surface of the thrust cancel disc and an inner circumferential surface of the separating wall, that is, a wall surface of the central hole portion, are provided opposite to each other.

7. The gas turbine engine according to claim 2, wherein the driving member is a rotor of a motor generator.

8. The gas turbine engine according to claim 1, further comprising:

a housing, comprising the turbine wheel and the compressor wheel; and a separating wall, installed on the housing and separating the turbine wheel and the compressor wheel, wherein a central hole portion is provided in a center of the separating wall, a hole diameter of the central hole portion is larger than an outer diameter of the thrust cancel disc, and the thrust cancel disc is located in the central hole portion, so that an outer circumferential surface of the thrust cancel disc and an inner circumferential surface of the separating wall, that is, a wall surface of the central hole portion, are provided opposite to each other.

9. The gas turbine engine according to claim 8, wherein a labyrinth seal structure is provided between the outer circumferential surface of the thrust cancel disc and the inner circumferential surface of the separating wall, that is, the wall surface of the central hole portion, for sealing.

10. The gas turbine engine according to claim 1, wherein the driving member is a rotor of a motor generator.

* * * * *